United States Patent [19]
Krichever et al.

[11] Patent Number: 5,591,952
[45] Date of Patent: *Jan. 7, 1997

[54] BAR CODE READER

[75] Inventors: Mark J. Krichever, Hauppauge; Boris Metlitsky, Stony Brook, both of N.Y.

[73] Assignee: Symbol Technologies, Holtsville, N.Y.

[*] Notice: The term of this patent shall not extend beyond the expiration date of Pat. No. 5,396,054.

[21] Appl. No.: 378,596

[22] Filed: Jan. 26, 1995

Related U.S. Application Data

[63] Continuation of Ser. No. 240,299, May 9, 1994, Pat. No. 5,396,054, which is a continuation of Ser. No. 41,281, Mar. 30, 1993, abandoned, which is a continuation of Ser. No. 317,533, Mar. 1, 1989, abandoned.

[51] Int. Cl.$^6$ ........................................ G06K 7/10
[52] U.S. Cl. ............................ 235/462; 235/470
[58] Field of Search ........................ 235/462, 470

[56] References Cited

U.S. PATENT DOCUMENTS

| | | | |
|---|---|---|---|
| 3,774,014 | 11/1973 | Berler | 235/471 |
| 3,978,317 | 9/1976 | Yamaguchi et al. | 235/61.11 E |
| 3,978,318 | 8/1976 | Romeo et al. | 235/61.11 E |
| 4,152,583 | 5/1979 | Nakamura | 235/462 |
| 4,251,798 | 2/1981 | Swartz et al. | 340/146.3 |
| 4,355,301 | 10/1982 | Isshiki et al. | 340/746.3 D |
| 4,360,798 | 11/1982 | Swartz et al. | 340/146.3 |
| 4,369,361 | 1/1983 | Swartz et al. | 235/470 |
| 4,387,297 | 6/1983 | Swartz et al. | 235/462 |
| 4,409,470 | 10/1983 | Shepard et al. | 235/472 |
| 4,418,276 | 11/1983 | Yatsunami | 235/462 |
| 4,418,277 | 11/1983 | Tremmel et al. | 235/472 |
| 4,460,120 | 7/1984 | Shepard et al. | 235/472 |
| 4,500,776 | 2/1985 | Laser | 235/162 |
| 4,516,017 | 5/1985 | Hara et al. | 235/472 |
| 4,570,057 | 2/1986 | Chadima, Jr. et al. | 235/472 |
| 4,652,730 | 11/1987 | Marshall | 235/456 |
| 4,673,805 | 6/1987 | Shepard et al. | 235/472 |

(List continued on next page.)

FOREIGN PATENT DOCUMENTS

| | | | |
|---|---|---|---|
| 51-114026 | 7/1976 | Japan . | |
| 14627 | 2/1979 | Japan | 235/462 |
| 55-115164A | 9/1980 | Japan . | |
| 115166 | 9/1980 | Japan | 235/462 |
| 57-6977A | 1/1982 | Japan . | |
| 58-166867A | 10/1983 | Japan . | |
| 60-27074A | 2/1985 | Japan . | |
| 133486 | 6/1986 | Japan | 235/462 |
| 61-208583A | 9/1986 | Japan . | |
| 62-236085A | 10/1987 | Japan . | |
| 63-204485A | 8/1988 | Japan . | |

OTHER PUBLICATIONS

Micron Technology, Inc. article entitled, "IS32 OptiCRAM™".

Micron Technology, Inc. article entitled, "IS256 OptiCRAM™".

Longacre, Jr., Stacked Bar Code Symbologies, Identification Journal, Jan./Feb. 1989.

*Primary Examiner*—John Shepperd
*Attorney, Agent, or Firm*—Arnold, White & Durkee

[57] ABSTRACT

In a bar code reader, a field of view which includes a symbol to be read is imaged upon a light-responsive array such as a CCD imager device. The output of this array is transferred to a memory array to provide a bit-mapped type of binary representation of the image including the symbol. The memory is scanned (instead of the field of view itself being mechanically scanned) to recognize and decode the symbol. Because the angular orientation of the symbol is variable, this binary representation may be interpreted to determine how the memory array is to be scanned to recognize the bar code symbol. For example, the distinctive patterns of characters used in bar codes may be found by scanning the memory and the relative positions of these patterns interpreted to determine the position, size and shape of the symbol in the memory, thereby defining at what angular displacement the memory array need be addressed to traverse the rows of the bar code symbol. Or, the memory array may be simply scanned using preselected scan lines (beginning with a raster-type scan) until code recognition is obtained.

39 Claims, 5 Drawing Sheets

U.S. PATENT DOCUMENTS

| | | | |
|---|---|---|---|
| 4,727,245 | 2/1988 | Dobbins et al. | 235/472 |
| 4,728,784 | 3/1988 | Stewart | 235/462 |
| 4,736,095 | 4/1988 | Shepard et al. | 235/472 |
| 4,746,789 | 5/1988 | Gieles et al. | 235/463 |
| 4,748,318 | 5/1988 | Bearden et al. | 235/472 |
| 4,748,319 | 5/1988 | Sasaki et al. | 235/472 |
| 4,753,498 | 6/1988 | Saitoh et al. | 350/6.8 |
| 4,758,717 | 7/1988 | Shepard et al. | 235/472 |
| 4,760,248 | 7/1988 | Swartz et al. | 235/472 |
| 4,761,544 | 8/1988 | Poland | 235/462 |
| 4,766,300 | 8/1988 | Chadima, Jr. et al. | 235/472 |
| 4,794,239 | 12/1988 | Allias | 235/462 |
| 4,822,986 | 4/1989 | Gunthmueller et al. | 235/470 |
| 4,850,009 | 7/1989 | Zook et al. | 379/96 |
| 4,864,630 | 9/1989 | Arnold et al. | 382/46 |
| 4,873,426 | 10/1989 | Sarna et al. | 235/462 |
| 4,879,456 | 11/1989 | Cherry et al. | 235/462 |
| 4,902,883 | 2/1990 | Poland | 235/462 |
| 4,948,955 | 8/1990 | Lee et al. | 235/462 |
| 4,967,074 | 10/1990 | von Stein | 235/467 |
| 4,988,852 | 1/1991 | Krishnan | 235/462 |

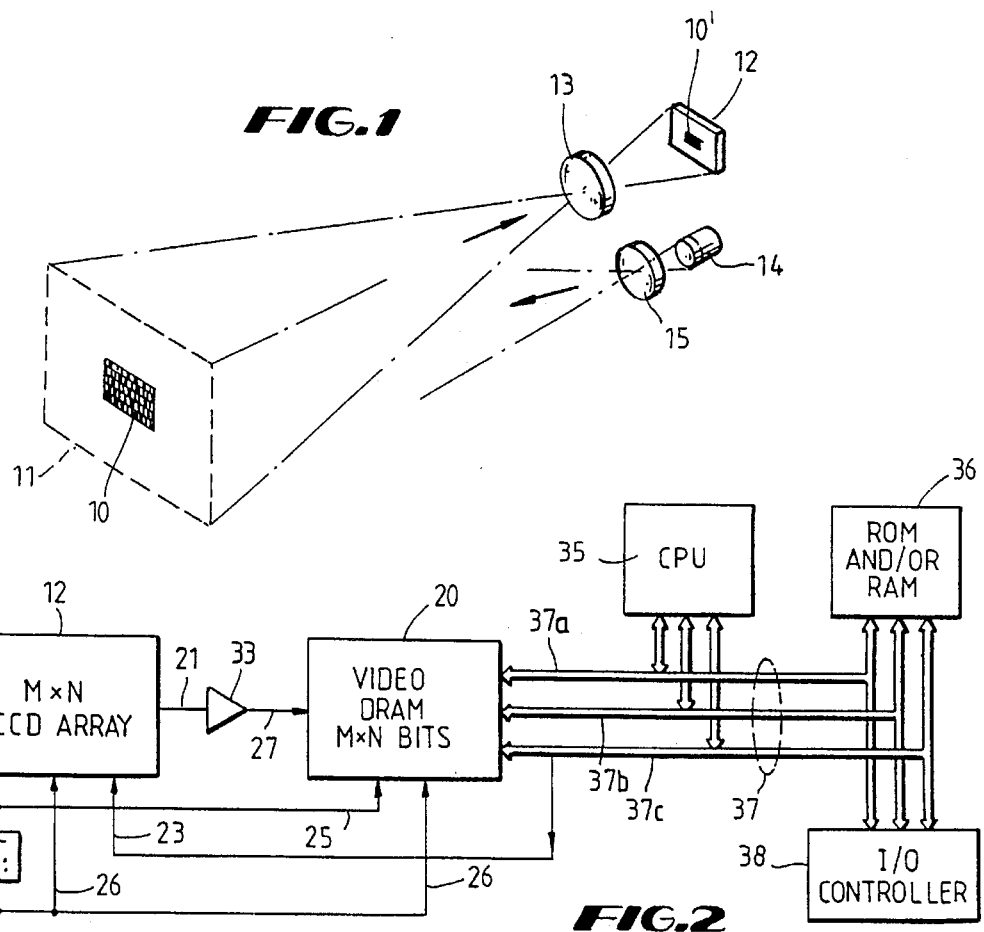
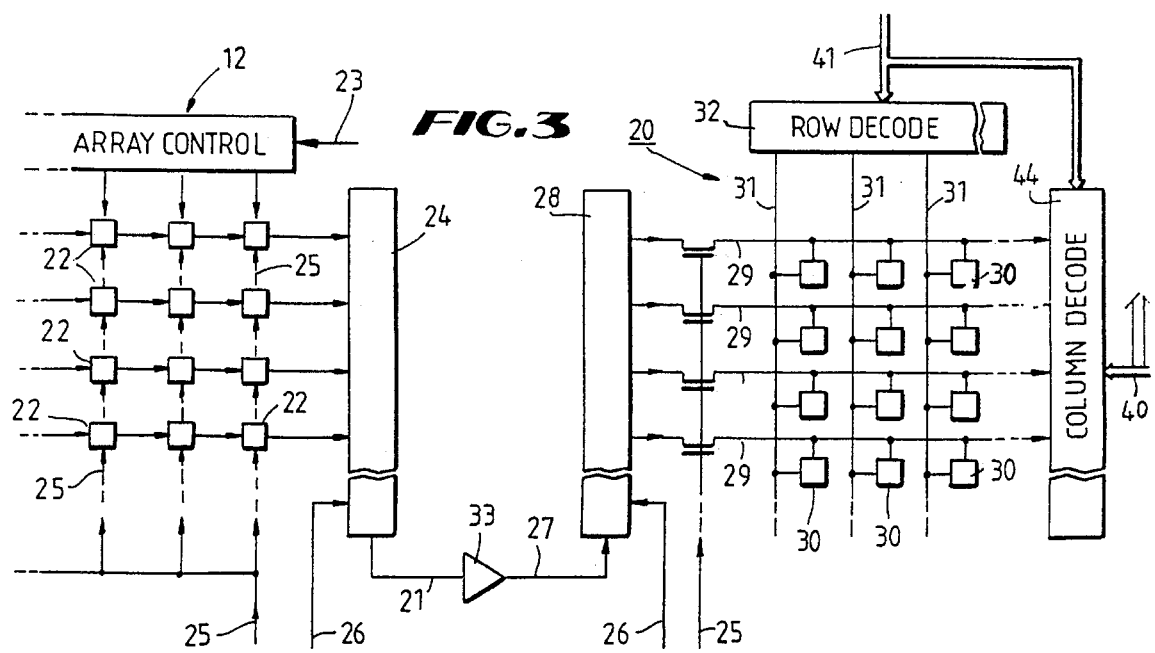

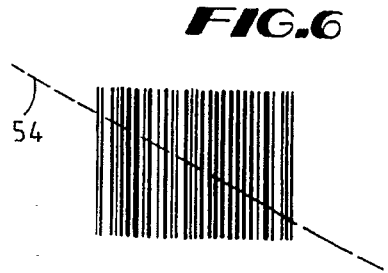
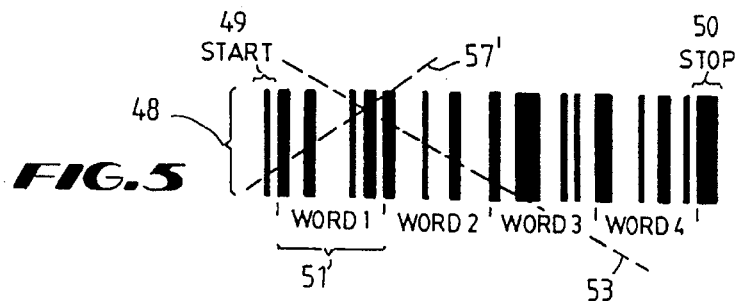
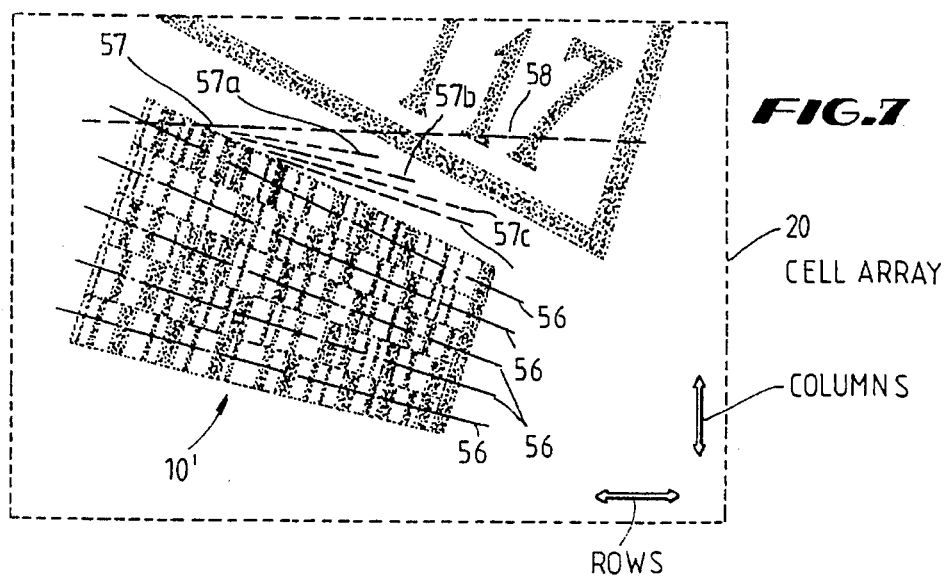
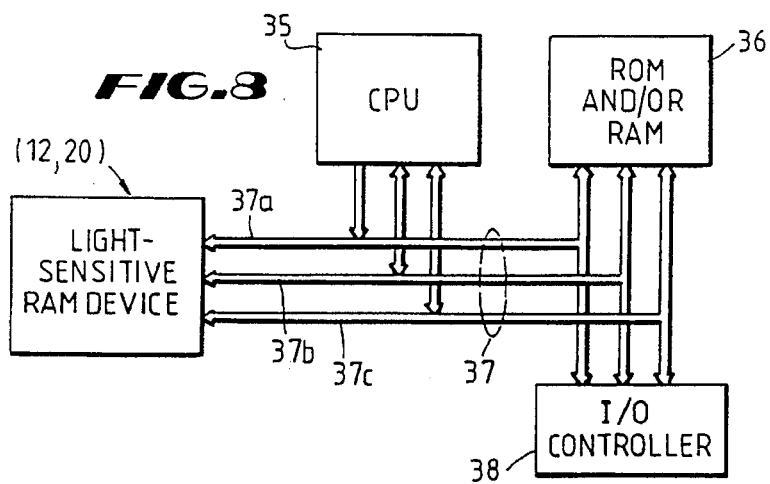
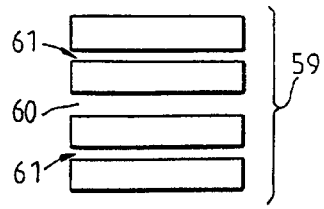

BAR CODE READER

This application is a continuation under 37 C.F.R. §1.60 of application Ser. No. 08/240,299, filed May 9, 1994, now U.S. Pat. No. 5,396,054 which was a file wrapper continuation of Ser. No. 08/041,281, filed Mar. 30, 1993 now abandoned, which was a file wrapper continuation of Ser. No. 07/317,533, filed Mar. 1, 1989 now abandoned.

RELATED CASES

This application contains subject matter also disclosed application Ser. No. 08/000,794, filed Jan. 1, 1993, now U.S. Pat. No. 5,414,250 which is a continuation of Ser. No. 317,433.

BACKGROUND OF THE INVENTION

This invention relates to bar code readers, and more particularly to a reader using electrical scanning of a bit-mapped image of a bar code symbol in a memory array.

Hand-held bar code scanners are disclosed in U.S. Pat. Nos. 4,387,297, 4,409,470 and 4,760,248, all assigned to Symbol Technologies, Inc. These bar code readers are gun-shaped units aimed by the user toward the symbol to be read. A light beam, usually generated by a laser diode in contemporary units, is mechanically scanned across the field of view by an oscillating mirror, for example. The reflected light is detected to produce electrical signals which are then processed to recognize the bar code. These types of scanners are used for reading conventional one-dimensional bar codes, two commonly-used types of these being referred to as UPC (Universal Product Code) and Code-39.

Hand-held scanners are distinguished from stationary bar code readers, one type of which is disclosed in U.S. Pat. No. 4,369,361, also assigned to Symbol Technologies, Inc. Stationary readers, of the type shown in U.S. Pat. No. 4,369,361, or of the type often seen in supermarket checkout counters, rely upon the operator to manually place the product bearing the symbol into a fixed field of view of the reader. In contrast, a hand-held scanner operates on the principle that the user aims the device at the symbol so that the line or scan will be at the proper angle to traverse the bar code symbol. In a typical hand-held reader, the scan or movement is generated by scanning the laser beam (or alternatively by mechanically scanning the detector, or both) along a single line in an operator-selected field of view. Stationary scanners instead rely upon mechanical scanning of the light beam across a fixed field of view at a number of different scan lines or angles to pick up bar codes at various positions.

In either hand-held or stationary scanners, with the scan being generated by mechanically oscillating or moving a light source or a mirror, the direction of each scan is fixed relative to the reader housing. If there is only one scan line, and the bar code symbol is located at an angle to this linear scan of the laser beam, then the user of a hand-held unit must twist the unit to align it with the angle of the bar code. Or, the operator of a stationary unit must twist the product to retry, hoping to align the symbol with one of the several scan lines. When a hand-held reader unit is being used at a retail check-out counter, the objects having bar codes to be read will be randomly oriented, and the items will be of many different sizes and shapes. Properly positioning the hand-held reader unit for reading bar codes thus becomes an awkward task. On the other hand, stationary-type scanners generating several scan paths at angles to one another still often require the operator to try several passes of the product until a valid read is obtained. Multiple-scan readers are not only mechanically complex and expensive, with a large number of moving parts, but even so still produce only a few fixed paths for scan lines, and if none of the paths are correct the operator must make additional passes until a code-recognition signal is produced.

In order to provide more information in the bar code symbols, and to allow the symbols to be smaller or more compactly shaped, new bar code standards have been adopted. One of these new code standards, Code-49, uses a more complex but efficient character set, and also introduces a two-dimensional feature so more data is contained in the symbol; this is accomplished by stacking rows of characters vertically instead of extending the bars horizontally. That is, there may be two or more rows of bars, up to eight, instead of only one row. A bar code of the Code 49 type having a number of rows of coded information is disclosed in U.S. Pat. No. 4,794,239, issued Dec. 27, 1988. A one-dimensional single-line scan, as ordinarily the case for hand-held readers, where the laser beam is swept back and forth across a narrow are, has disadvantages in reading these two dimensional bar codes; that is, the reader must be aimed at each row, individually. Likewise, the stationary multiple-scan-line readers produce a number of scan lines at an angle to one another so these are not suitable for recognizing Code-49 type of two-dimensional symbols.

In U.S. Pat. N. 4,816,661, filed Dec. 22, 1986, and issued Mar. 28, 1989, and assigned to the assignee hereof, a hand-held laser scanner for reading bar codes is disclosed that generates a scan pattern of mutually parallel lines extending linearly across each symbol; the scan lines sweep in opposite directions and are vertically spaced from one another. If a symbol is backwards or upside down, this scanning method facilitates obtaining a valid decode.

It is therefore a principal object of this invention to provide an improved bar code reader adapted for electrical scanning rather than mechanical scanning, particularly a reader which recognizes bar code symbols at various angular positions within the field of view of the reader. Another object is to provide an improved bar code reader adapted for recognizing two-dimensional symbols, e.g., symbols having two or more rows of bars. A further object is to provide an improved bar code reader adapted for recognizing symbols at random or arbitrary orientation in the field of view of the reader, e.g., recognizing symbols having rows of bars and spaces at an angle to the nominal axis of the scanning line of the reader unit. It is another object to provide a bar code reader for which physical alignment of the reader with the orientation of the bar code symbol is less critical, and the alignment of the scan with the symbol is accomplished electrically rather than by the operator or by product positioning. An additional object is to provide a bat code scanner which does not need to employ mechanical scanning of the symbols. Also, it is an object to provide a method of scanning bar codes or the like which is faster and more reliable. It is also an object of the invention to provide an improved method of rotating the image of a bar code symbol stored in a memory or detected by a light-responsive array in reading two-dimensional bar codes.

SUMMARY OF THE INVENTION

In accordance with one embodiment of the invention, a symbol to be read is imaged upon a light-responsive array such as a CCD imager device or the like. The output of this array is transferred to a memory array to provide a binary representation (bit-mapped) of the image of the symbol. This bit-mapped representation in the memory array is scanned to recognize and decode the symbol. Because the angular orientation of the symbol may be variable, this binary representation may be interpreted to determine at what angle the memory array is to be scanned to recognize the bar code symbol. For example, the distinctive patterns of characters (bars and spaces) used in bar codes may be found in the bit-mapped image and the relative positions interpreted to determine the position, size and shape of the image of the symbol in the memory, thereby defining at what angular displacement the memory array need be addressed to traverse the rows of the bar code symbol. Or, the memory array may be simply scanned using preselected scan lines (beginning with a raster-type scan, for example) until code recognition is obtained, i.e. without first evaluating the content of the memory to find the symbol and determine its position and orientation. Then, when recognizable bar code patterns are reached in the memory array addressed in this manner, the addressing is altered according to an algorithm to trace the rows or image of the bar code symbol (at whatever angle), until a complete symbol is decoded.

The memory array may be the same device as is used as the image converter; light-responsive memory devices are available which perform the dual function of converting a light image to a binary electrical representation, and also storing the binary data and allowing random access to it. Thus electrical scanning may be implemented in the same device used for image conversion.

In either of these types of memory devices, the concept of, in effect, rotating the image and/or translating the image is important to this invention; this rotation feature (whether by selecting the scan path in the memory, or by rotating the image in the memory so a fixed scan path can be used) allows the symbol to be decoded even though the orientation of the symbol in the field of view is not aligned with the "horizontal" axis of the mechanism. Translation (rectilinear movement, rather than angular) of the image in the storage array is possible for positioning the image in a more optimum location.

BRIEF DESCRIPTION OF THE DRAWINGS

The features believed characteristic of the invention are set forth in the appended claims. The invention itself, however, as well as other features and advantages thereof, may best be understood by reference to the detailed description of a specific embodiment which follows, when read in conjunction with the accompanying drawings, wherein:

FIG. 1 is a pictorial view of a bar code reader configuration which may use features of one embodiment of the invention;

FIG. 2 is an electrical schematic diagram in block form of a bar code reader system used with the configuration of FIG. 1;

FIG. 3 is an electrical schematic diagram of the photodetector array and the memory array used in the circuit of FIG. 2;

FIG. 4 is an enlarged view of a bar code symbol to be read by the system FIGS. 1, 2 and 3;

FIG. 5 is a further enlarged view of one row of the bar code symbol of FIG. 4;

FIG. 6 is an enlarged view of a more-conventional bar code symbol;

FIG. 7 is a schematic representation of a bit-mapped image of a bar code symbol in a memory array in the system of FIGS. 1, 2 and 3;

FIG. 8 is an electrical diagram corresponding to FIG. 2 of a bar code reader system employing a light-sensitive RAM device instead of a CCD image sensor, according to another embodiment of the invention:

FIG. 9 is a diagram of the array of light-sensitive RAM cells in the device FIG. 8;

DETAILED DESCRIPTION OF A SPECIFIC EMBODIMENT

Figure 10:
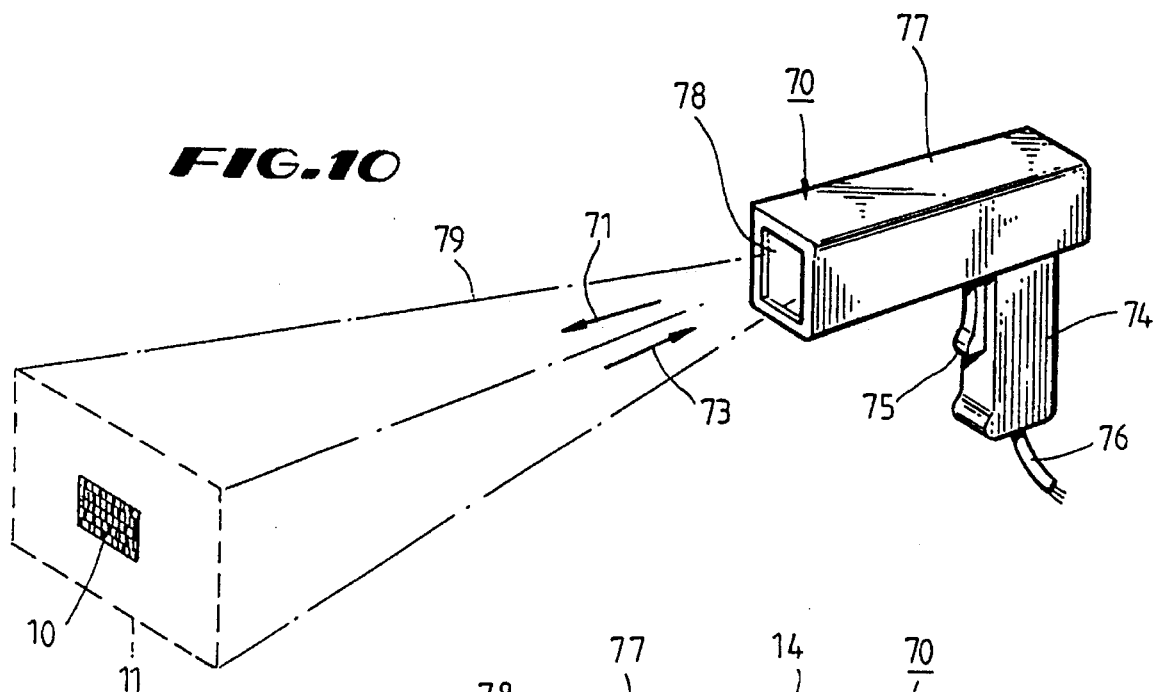
FIG. 10 is pictorial view of a hand-held bar code scanner unit which may use features according to one embodiment of the invention.

Referring to FIG. 1, the elements of a bar code reader of the type which may use features of the invention is illustrated. The object is to optically image or focus a bar code symbol 10, which is part of a field of view 11, onto a light-responsive array 12, using a suitable optical system represented by a lens 13. A light source 14, preferably of the light-emitting diode type, or an incandescent or florescent lamp, or the like, illuminates the field of view 11 through a suitable lens system 15, although ambient light could be used to illuminate the field instead. It is common to use red LEDs as the light source 14 and red filters in the optics to filter out unwanted light, thus increasing the signal-to-noise ratio. The light-responsive array 12 is preferably a charge-coupled device (CCD) of the type commercially available, although other types of photodetector arrays are also suitable, such as a charge injection device (CID). Instead of a CCD, for example, a light-responsive memory device can be used to both convert the image to a binary representation of incident light, and to store the binary data for access by a CPU for code recognition; one such memory device is an OpticRAM™ device commercially available from Micron Technology, Inc., Boise, Id. This OpticRAM device is a 64K or 256K dynamic RAM array having a light-transparent window above the chip in the I/C package, as described in U.S. Pat. No. 4,441,125. Various optical systems are known which enhance the function of imaging the field 11 onto the photodetector array 12, such as automatic focusing mechanisms of the type used in commercially-available video and 35-mm cameras; it is understood that such equipment is useful in the practice of this invention. A zoom mechanism may be used to adjust the size of the image of the symbol 10 on the photodetector array 12.

Instead of a semiconductor device such as the CCD or RAM as discussed, the imager converter 12 may be a vidicon of the type used for generating TV signals. Standard NTST video employs a vertical resolution of 525 lines in an interlaced raster scan, with a horizontal resolution usually about 400 pixels per line or less, depending upon the quality of the vidicon. As discussed below in regard to CCDs, the resolution needed for recognizing bar code symbols depends upon the type of bar code, the optics employed, size of field of view, average depth of field needed, etc.

As illustrated in FIG. 2. in one embodiment the photosensitive array 12 of FIG. 1 is used to generate an electrical image of the field of view 11 for transferring to a semiconductor memory device 20. The array 12 may be a CCD imaging device of the type used in hand-held video cameras of the consumer type, or the like. A CCD device is a silicon chip made by integrated circuit manufacturing techniques, and functions to create a serial output on a line 21 representing the light impinging upon each photo-responsive element or "picture element" (pixel) in the array. An enlarged view of a small part of the array in the CCD device 12 is seen in FIG. 3. A large number of photo-elements 22 are arranged in M rows and N columns in this array, where M and N are numbers representing the number of rows and columns. A control input 23 controls the light capture function, a signal on input 23 causes each element to capture and store a charge responsive to the light then incident upon this element; the array is then no longer sensitive to light after this control input 23 is activated, and the charge packets stored in each element can be read out. To this end, the rows are shifted into an N-bit shift register 24, one column of elements at a time, by clock voltages applied to the elements 22 by lines 25. The shift register 24 is clocked out onto the line 21 by clock voltage input 26. The clock on line 25 can be derived from the clock on input 26 by dividing by N, the number of columns in the detector array 12.

The MxN array 12 may be 256×256, for example, meaning there are 256 rows of elements and 256 elements 22 in each row (256 columns); in this case the clock 26 would occur 256 times for each one of the clocks on line 25. The density of the array 12 is selected according to the resolution required for the system, and may be less than 256×256, or more. However, continuing with this example, note that the memory 20 may be also a 256×256 array, in which case a one-for-one correspondence is provided between the elements of the array 12 and the memory cells of the memory device 20. For example, a 64K-bit video DRAM of the type commercially available under the part number TMS4161 provides a 256×256 cell array having both serial and random-access I/O ports; this video DRAM device is one example of a device suited for use as the memory device 20 because serial access can be at a much higher clock rate than the cycle time for random access, and because random access can be occurring at the same time as serial loading of the memory from the CDD occurs.

If higher resolution is needed, 256K video DRAMs are available providing 512×512 pixel arrays (higher resolution than commercial TV, for example), or 1-Mbit video DRAMs providing 1024×1024 arrays. For high density symbols (using the maximum density of Code-49, for example), a 2048×2048 memory 20 paired with a 2048×2048 CCD might be optimum; the 2048×2048 bit video DRAM could be comprised of four 1-Mbit video DRAMs, since 4-Mbit video DRAMs are not available at this time. Also, other types of memory devices may be employed instead of video DRAMs. For example, standard DRAMs having "by-4" I/O data lines may be used, or static RAMs with 4-bit or 8-bit wide data I/O paths. Static RAMs provide faster access than DRAMs, but use more power and are more expensive.

In the circuit of FIGS. 2 and 3, the clock input 26 used to shift the bits out of the N-bit shift register 24 of the CCD device 12 is also used as a serial clock input 26 to the video DRAM, since the data will be clocked out of the CCD 12 in synchronization with clocking-in of the serial data bits at serial input 27 to the DRAM 20. Likewise, the same clock 25 used to shift the columns of charge packets into the shift register 24 of the CCD can be used to transfer the N bits of incoming data from a shift register 28 in the input of the video DRAM 20 to column lines 29 in the cell array. The DRAM 20 has an array of dynamic memory cells 30 in rows and columns having a one-for-one correspondence to the photo-responsive elements 22, so there are M rows and N columns of cells. So, after N clock pulses (256, in the example) on the input 26, the shift register 28 is full, and one clock on input 25 loads this N-bits of data onto the N column lines 29: then, one or the N row lines 31 is activated by a row decoder 32 to load this N-bits of data to one of the rows of memory cells 30, where they will remain stored until written over. The sequence then repeats; another N bits are shifted into shift register 24 of the CCD, then clocked out by clock 26 while being clocked into the shift register 28 of the DRAM 20, so, after MxN clocks on line 25, or N clocks on line 26, all MxN (64K-bits, i.e, 65,536 bits, in the example) of data from the photodetector 12 will have been transferred to the DRAM 20. The detected light at picture elements 22 of the photoresponsive device 12 is thus transformed into electrical charge packets which are transferred in a bit-mapped manner into the memory 20, one-for-one, in corresponding locations. A threshold-responsive buffer 33 is used between the output 21 of the CCD and the DRAM input 27 if the output 21 is analog instead of digital, so that the input 27 is either a binary one or a zero, not a variable-level voltage.

The bit-mapped image in the memory 20 is accessed by a CPU device 35 of FIG. 2, where this CPU may be an 8-bit or 16-bit microcontroller or microprocessor such as a part numbers 8042 or 8051 (microcontroller devices) or 8086/8088 (microprocessor devices) manufactured by Intel Corporation of Santa Clara, Calif. The microprocessor type selected depends upon the level of performance needed for the particular system. The 8051 type of microcontroller has an internal (on-chip) ROM or EPROM for program storage, and an internal RAM for temporary data storage, while an 8086 type of microprocessor requires an external memory 36 for storing programs and data. If an external read/write memory 36 is included, the image data from memory 20 can be loaded into this memory 36 for further processing, such as employing graphics algorithms of the translate/rotate type, for example; if the memory 20 is used as the principal storage location for the image data, however, then rewriting transposed image data to this memory 20 by the CPU 35 will destroy existing image data, allowing limited such transposition. A system bus 37 includes an address bus 37a, a data bus 37b and a control bus 37c; the bus is used for accessing the memory 36 if one is needed, and of course for accessing the video DRAM 20, as well as for accessing an I/O controller (or controllers) 38 for communicating with a keyboard input, a display, or data output to a host computer, or the like.

The video DRAM 20 is a dual-ported memory; in addition to the serial port 27 described above, the video DRAM 20 has a "random access" type of data I/O port 40 connected to the data bus 37b for accessing the bit-mapped image data by the CPU. The video DRAM can have a 4-bit wide data I/O port 40, so four bits are accessed in parallel at one time, instead of 1-bit. The video DRAM has a multiplexed address input on lines 41 connected to address bus 37a; a row address is applied first, along with a row address strobe on the control bus 37c, then a column address is applied along with a column address strobe. These addresses are loaded into address buffers for the row and column decoders 32 and 44. Thus, for a 64K video DRAM, an 8-bit address is applied to the decoder 32 from the CPU to make a 1-of-256 selection for loading the serial register 28 to one of the rows of the cells 30; this loading also requires the sense amplifiers to be strobed, which occurs when the row address strobe is activated. Or, an 8-bit address is applied to the decoder 32 to select a row for input to the column decoder 44, then a column address applied to the decoder 44 from the CPU to select a column or columns for output on the data I/O bus 40 via the data bus 37b to the CPU 35. In this manner the CPU accesses the bit-mapped image data in the memory 20 to thereby scan and interpret the image of the field of view 11, find the symbol 10, and decode the characters in the symbol.

The CPU 35 can access the video DRAM 20 via data port 40 and address input 41 at the same time that the serial data is being clocked into the serial port 27 by clock 26, so the CPU can begin evaluating the image to find and orient the symbol before the entire image has been loaded. The time needed to transfer the bit-mapped image is about (64K)×(50 ns) or 3.2 ms, assuming a 20 MHz serial clock 26, but during this time the CPU can make many thousands of accesses or the image data in the DRAM for evaluation. If higher speeds are required, some video DRAMs support higher serial clock rates, e.g., 40-MHz. Also, a "by-4" serial input is available, which would allow four serial bit streams to be clocked in simultaneously. In addition, if a static RAM is used instead of a video DRAM, access speeds can be faster; a serial-to-parallel converter using a high-speed 8-bit shift register can be used to input the data from the CCD to a static RAM having an 8-bit parallel data I/O port.

FIG. 4 shows an example of a bar code symbol 10 of the type to be read by the system of FIGS. 1–3. Although the system is suitable for reading various types of bar codes, this symbol 10 is a Code-49 type, having (in this example) five rows 48 of characters. The physical size of this symbol is variable. The lower limit is specified to be 7.5 mil for the "X" dimension, i.e., the width of a minimum-width line in one of the bars in one of the rows 48; the tipper limit depends upon the method used to reproduce the symbols, and of course upon the size of the objects to which the coded symbols are to be applied. Using minimum sized symbols, a net data density of 93.3 alphanumeric characters per inch or 154.3 numeric digits per inch can be achieved with this standard code. The Code-49 specification allows up to eight rows 48 in one symbol 10. The view of FIG. 4 is much larger than actual size for many Code-49 type symbols printed for use in typical applications. As seen in FIG. 5, an enlarged view of one of the rows 48 in the symbol 10 of FIG. 4, the row will always begin with a start pattern 49 and end with a stop pattern 50. Between the start and stop patterns, a number of words 51 are defined by the width and spacings of black lines and gaps; each word 51 encodes two characters from a defined character set. The row 48 of FIG. 5 is merely an illustration; usually there are more words per row. The image bit-mapped into the memory 20 of course corresponds to the black and white pattern of FIG. 4 or 5 translated to binary ones and zeros. The optics, size of field of view 11, number of bits (resolution) of the photoresponsive device 12, etc., are all chosen so that the minimum line width in the patterns of FIGS. 4 and 5, when translated to a bit-mapped image in the memory 20, produces (preferably) at least about four or five bits or cells 30 of data for a minimum-width line perpendicular to the line of scan or read-out of the memory. To this end, the example given of the use of a 256×256 imager 12 and memory 20 would mean that a pattern such as seen in FIG. 4 (if it is of maximum allowable density for Code-49) would have to occupy almost the entire 256-bit width of a row of the memory array if optimum data for recognition is to be provided at the memory read-out (although it is understood that many lower-density Code-49 configurations are also useful). For this reason, a higher-density CCD array may best be used for the imager 12, and correspondingly a higher-density array for the memory 20. For example, a 1024-by-1024 array means the image of the symbol could occupy about one-fourth of a row of cells, while a 2048×2048 array would allow the image to be about one-eighth of a row. Thus, selection of the required resolution is a trade-off involving cost of parts, tolerable time delay in transferring the image from the CCD into the memory then scanning the image by the CPU and evaluating, etc., vs. how much of a burden of precise positioning of the reader unit or product is to be imposed upon the operator.

Referring to FIG. 4, a scan along a line 53, would intercept parts of more than one row 48 and so would produce no reading. This is in contrast to a more-conventional UPC type of bar code symbol as seen in FIG. 6, where a scan line 54 at an angle to the central axis still produces a valid reading. Addition of the multiple rows 48 in the Code-49 type of symbol seen in FIG. 4 thus makes the scanning task more difficult. Nevertheless, even though not giving a valid reading of an entire row 48, the scan line 53 may still result in the software recognizing that a part of a row of words of a bar code have been scanned. For example, the line 53 as it appears in FIG. 5 makes a complete trace of word-2, but not of word-1 or word-3. This ability to intercept and interpret partial rows may be employed in the task of "finding" the symbol within the image in the memory 20 by the algorithm executed by the CPU 35.

Another complicating factor is that the image of the bar code symbol in the memory 20 is not necessarily rectangular; this is in addition to the image likely being at an angle to the major axis. The image is not necessarily rectangular because the package or object on which the symbol resides in the field of view 11 may be twisted rather than being aligned with the plane of the field. This non-alignment will result in a distorted shape as seen in FIG. 7, where the image 10' of symbol 10 bit-mapped into the cell array 55 of the memory 20 is at an angle to the rows of cells and also larger at one end than at the other. Scan lines such as the lines 56 must be generated, each at a slightly different angle, or the image must be rotated until the rows are parallel to the rows (or columns) of the memory device. Note also that the image 10' might be reversed from left to right if the package having the bar code symbol on it is upside down in the field of view, so the direction of scan can be left-to-right or right-to-left, or otherwise the data can be transposed after loading into the registers of the CPU 35 for evaluation.

The image 10' of the symbol as it exists in binary form in the memory 20, corresponding to FIG. 7, may also be non-linear, as occurs if the product is a bottle or can such that the bar code symbol defines a cylindrical shape. In this case, if the reader is positioned at something other than exactly normal to the axis of the cylinder and directly over the symbol, the image will require non-linear scan lines interpretation of the symbol.

The data in memory 20 can of course be read in any pattern, as selected by the program executed by the CPU 35. i.e., as determined by the sequence of row and column addresses used to read the data bit-by-bit from the memory. To scan the memory along one of the scan lines 56 of FIG. 7, the row address loaded to the row decode 32 via bus 41 would be incremented after each read cycle, and the column address loaded to decoder 44 would be decremented after a selected number of read cycles, depending upon the angle needed. The number of row address increments for every column address decrement would be higher for the upper lines 56 than for the lower ones in FIG. 7, since the angle needed to trace the row 48 is greater. Of course, a raster scan is produced if the column address is incremented or decremented after a complete row has been read while maintaining a constant column address.

Figure 12:
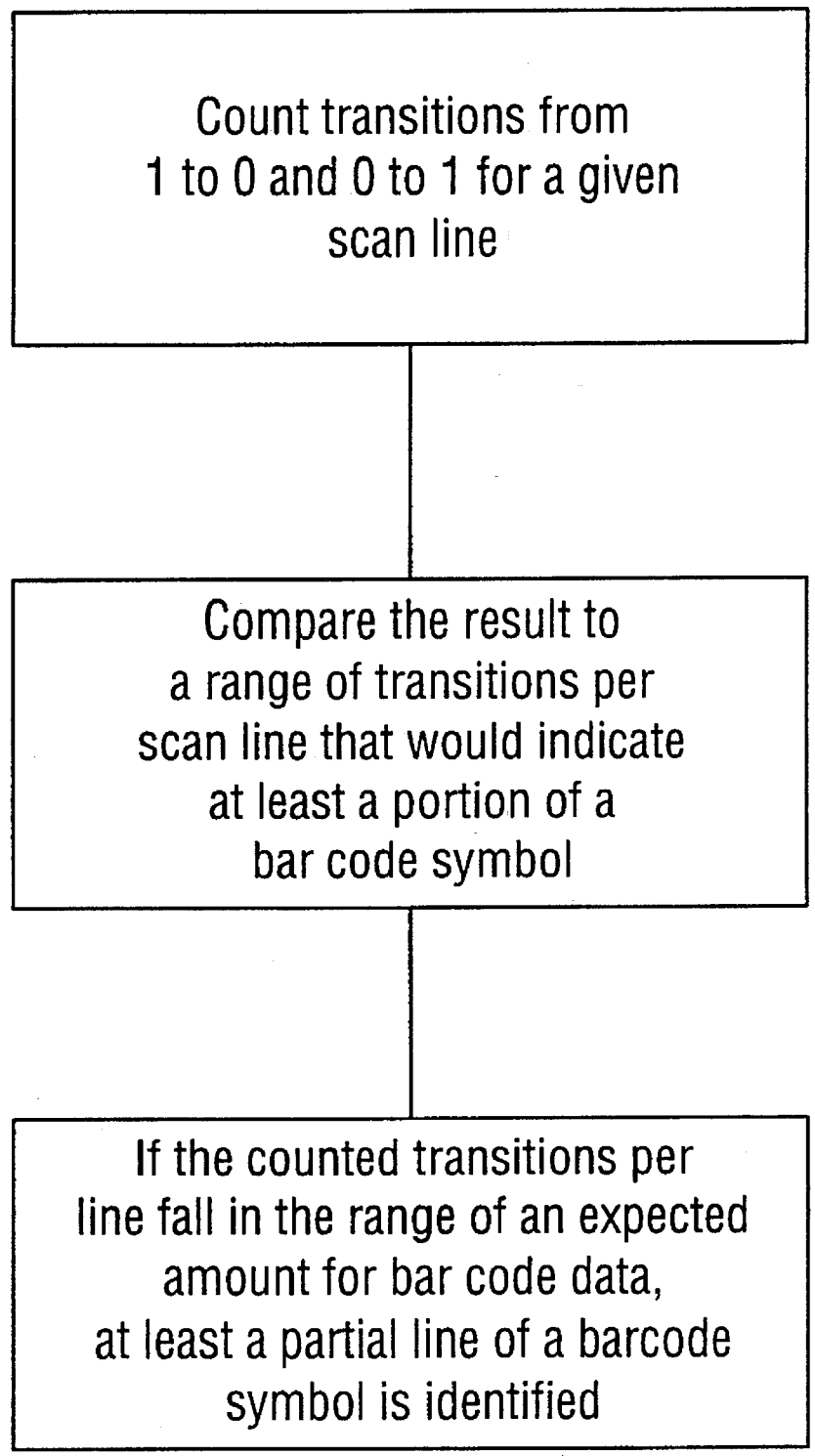
FIG. 12 is a flow chart of a preferred method.

Before scan lines 56 of FIG. 7 at the proper angles could be calculated, the symbol 10' would have to be found in the memory array and the orientation of the rows 48 determined. Various algorithms could be used for this purpose; one would comprise reading the memory array in a raster scan, one row (or column) at a time, in rectilinear fashion, to see if recognizable bar code patterns are found. Such a raster scan of the image of FIG. 7 would find a recognizable code pattern when it reached a position indicated by line 57, corresponding roughly to the line 57' of FIG. 5. There are various ways of detecting the existence of a bar code in a serial electrical signal representing a sequence of samples produced by a linear scan; for example, the number of transitions between black and white (1's and 0's) can be counted, and this value, as a function of the length of scan (or transitions per unit length) is a distinguishing factor as shown in FIG. 12. In this manner, the bar code pattern would be distinct from other printing on the product label such as text or numbers in the area 58 intercepted by the scan line 57 of FIG. 7. Another way of distinguishing a bar code pattern from other images such as area 58 is the ratio of black to white per unit length; bar code symbols fall into a range of such ratios different from printed text or alphanumeric characters found on product labels. Still another way of distinguishing is to compare two adjacent scans to see if the same sequence of 1's and 0's is produced over a substantial part of the row. In addition, of course, the patterns may be compared to valid code patterns stored in ROM in memory 36 by a table look-up. Using any one or combination of such methods, the symbol 10' is found within the memory array by reading data and interpreting strings of this data read-out using instructions executed by the CPU 35 or equivalent logic circuitry. Then when any part of the symbol 10' has been located, the next task is to find the angular direction of rows. The first attempt is of course a rectilinear line, i.e., a continuation of the line 57 for the remainder of the row, without changing the row address; this will produce no more recognizable bar-code patterns, so a series of angular scans can be implemented, starting at the centerpoint of the addresses which produced the recognized code pattern, for example at 5° increments, producing a series of scan lines 57a, 57b, 57c, etc., until the top line 56 is scanned and a complete line of code is recognized including start and stop codes 49 and 50. If no complete recognizable row is found, but instead a set of partial row segments of increasing then decreasing number of recognizable characters, then the row is curved (resulting from a symbol on a curved surface such as a can or bottle) so the scan line will be switched to a different angle at the addresses of the end of the scan giving the most recognizable characters, producing a series of segments instead of a straight-line scan. In either event, after one row is recognized, then scans are made parallel to the good row until a different set of good characters is recognized, meaning a new row is being scanned. This continues until a complete symbol has been recognized. Usually, the symbol will contain within its characters information on the number of rows and the number of characters in the symbol, as well as a checksum or CRC of the characters, so a complete symbol can be positively identified by a suitable algorithm executed by the CPU 35. After reading the bit patterns found in the memory array, the CPU 35 can execute table-lookups to convert the bit patterns into characters. Many other algorithms for interpreting the image in the memory 20 and decoding the bar code symbol represented by this image using the instruction set of a commercially-available microprocessor 35 may be selected by a skilled programmer.

With reference to FIG. 8, an embodiment of the invention is illustrated wherein an OpticRAM™ solid-state image sensor as set forth above is used for the light-responsive array 12 and also for the memory 20. This device is a random access memory commercially available from Micron Technology, Inc., as part number IS32 which is a 64K-bit array, or part number IS256 which is a 256K-bit array (one-fourth usable). These devices are random access devices, accessible by applying row and column addresses to multiplexed address input terminals as before, along with row-address strobes and column-address strobes, with the output being 1-bit wide. The RAM device is therefore accessible by the CPU 35 using the bus 37 as before. These devices require an exposure time or so-called "soak time" of about 250-ms to ensure that sufficient light impinges upon each cell to be read out as a logic "1" for white objects, resulting in a "shutter speed" of about ¼ sec.; this speed is in contrast to CCD devices which can operate at NTSC video rates, i.e., a frame every 1/60th sec. (indeed, some CCDs used in camcorders allow shutter speeds faster than 1/60th sec.) The access time in page mode for the 64K usable cells of a 256K IS256 device is about 15to-20 ms total, allowing for refresh (these RAM devices have to be refreshed just like a DRAM), so the read out time is very small compared to the soak time. The cell array 59 of this memory chip is split into four arrays as seen in FIG. 9, due to the sense amplifiers and column decoders needed in the DRAM array, so a gap 60 of about 350-micron exists in the center and a gap 61 of about 100-micron between each half; for this reason, only one-fourth of the array is usable, giving a resolution of 128×512 for the IS256 device.

Figure 13:
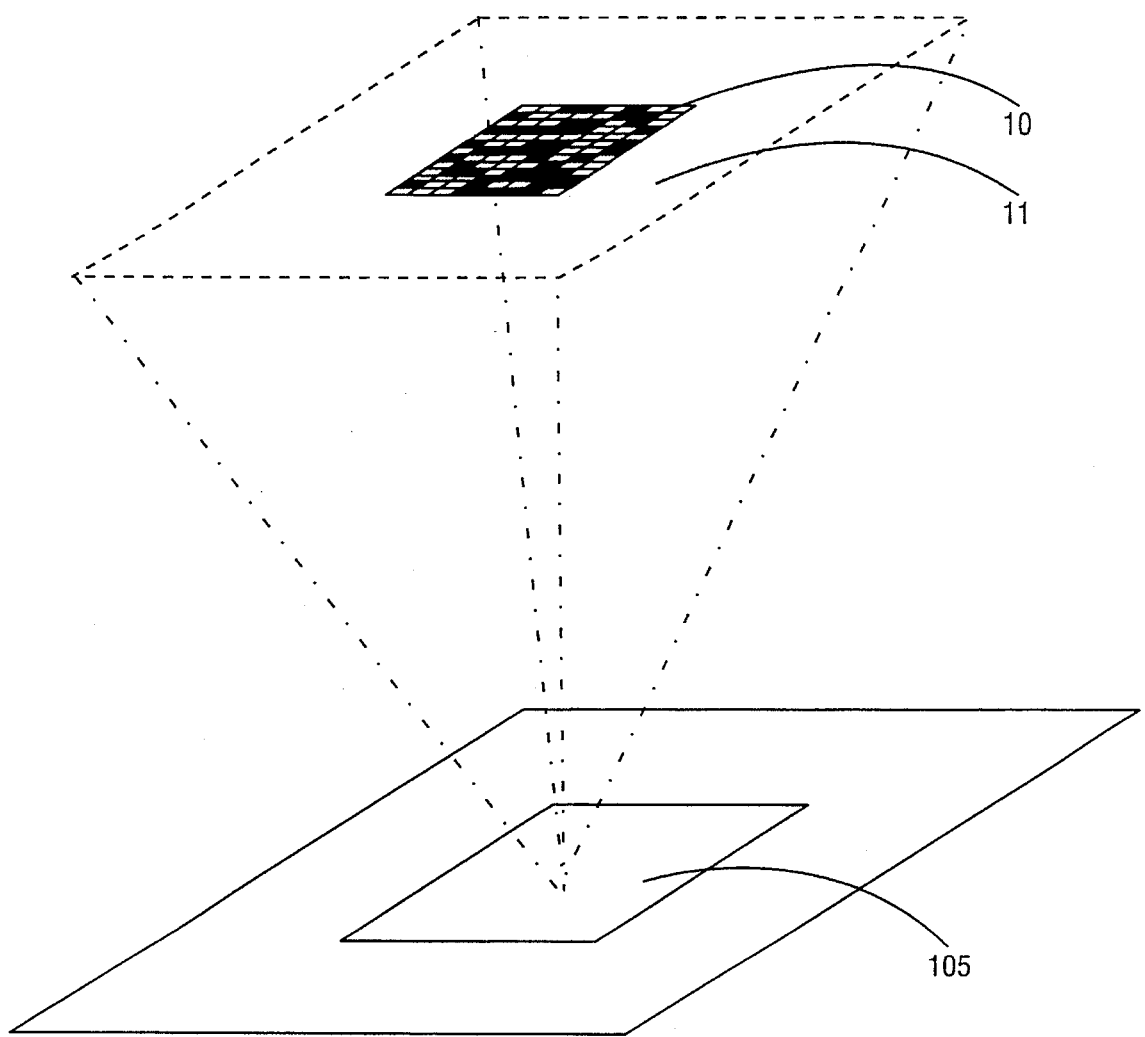
FIG. 13 is a pictorial view of a stationary bar code reader in relation to a field of view containing a bar code.

The concept of the invention may be implemented in a hand-held reader unit 70 as illustrated in FIG. 10, as well as in the stationary unit 105 as demonstrated in FIG. 13 and discussed above. The hand-held device of FIG. 10 is generally of the style disclosed in U.S. Pat. No. 4,760,248, issued to Swartz et al, assigned to Symbol Technologies, Inc., and also similar to the configuration of a bar code reader commercially available as part number LS 810011 from Symbol Technologies, Inc. Alternatively, or in addition, features of U.S. Pat. No. 4,387,297 issued to Swartz et al, or U.S. Pat. No. 4,409,470, issued to Shepard et al, both such patents assigned to Symbol Technologies, Inc, may be employed in constructing the bar code reader 70 of FIG. 10. These U.S. Pat. Nos. 4,760,248, 4,387,297, and 4,409,470 are incorporated herein by reference. A outgoing light beam 71 is generated in the reader 70, usually by a laser diode or the like, and directed to impinge upon a bar code symbol 10 a few inches from the front of the reader. The outgoing beam 71 is not scanned back and forth across the symbol 10, but instead is broad enough to illuminate a field 11 including the entire symbol 10 at once. Reflected light 73 from the symbol is detected by a light-responsive array 12 in the reader 70, producing electrical signals to be processed for identifying the bar code as above. The reader 70 is a gun-shaped device having a pistol-grip type of handle 74, and a movable trigger 75 is employed to allow the user to activate the light beam 71 and detector circuitry when pointed at the symbol to be read, thereby saving battery life if the unit is self-powered. The reader 70 usually is connected to a host computer by a wire cable 76, but, as disclosed in the above-mentioned U.S. Pat. No. 4,409,470, the coupling may be by radio frequency radiation included in the reader 70 so the reader is self-contained. A light-weight plastic housing 77 contains the laser light source, the detector, the optics and signal processing circuitry, as well as a battery it the unit is self-powered. A light-transmissive window 78 in the front end of the housing 77 allows the outgoing light beam 71 to exit and the incoming reflected light 73 to enter. The reader 70 is designed to be aimed at a bar code symbol 10 by the user from a position where the reader 70 is spaced from the symbol, i.e., not touching the symbol or moving across the symbol. Typically, this type of hand-held bar code reader is specified to operate in the range of about one-inch to twenty-inch spacing between the window 78 and the symbol 10, with a spacing of about three or four up to about twelve inches being preferred. The beam 71 is constrained by the optics to be within a conical pathway 79, and the system of this embodiment uses a broad-area, non-scanned, conical beam, as distinguished from a narrow, rapidly-scanned beam as typical in the readers of the above-mentioned LS 8100II type or those shown in the above-mentioned patents.

Figure 11:
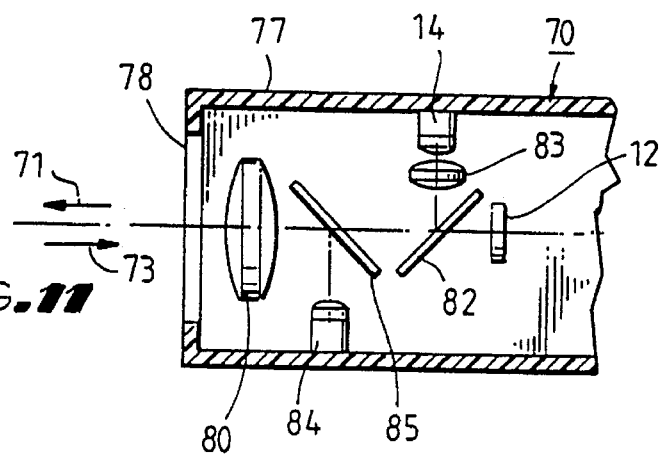
FIG. 11 is a sectional view of a part of the reader unit of FIG. 10.

Referring to FIG. 11, a suitable ions 80 (or multiple lens system) is used to collimate and focus the beam into the desired conical path 79, and this same lens 80 may be used to focus the reflected light 73. A light source 14 such as a light-emitting diode as above is positioned to introduce a light beam into the axis of the lens 80 and conical path 79 by a partially-silvered mirror 82 and other lenses 83 or beam-shaping structure as needed. Likewise, if the light produced by the source 14 is not visible, an aiming light 84 may be included in the optical system, again employing a partially-silvered mirror 85 to introduce the beam into the light path coaxially with the lens 80. The aiming light 84, if needed, produces a visible-light spot which the user employs to aim the reader unit at the symbol 10 before pulling the trigger 75; in this manner, when the light source 14 and the detector circuitry are activated the symbol 10 will be within the field of view 11 of the reader. The circuitry of FIGS. 2 and 3 or FIG. 8 can be used with the unit of FIGS. 10 and 11 to create a bit-mapped image of the field of view 11 and symbol 10 in a memory for electrical scanning and decoding as above set forth.

While the invention has been described with reference to a specific embodiment, the description is not meant to be construed in a limiting sense. Various modifications of the disclosed embodiment, as well as other embodiments of the invention, will be apparent to persons skilled in the art upon reference to this description. It is therefore contemplated that the appended claims will cover any such modifications or embodiments as fall within the true scope of the invention.

What is claimed is:

1. A method of reading a two-dimensional bar code symbol having a plurality of linearly arranged indicia patterns of encoded information having a reading direction corresponding to said linear direction, said method comprising the steps of:

(a) optically imaging upon a light-detector array a field of view including said symbol to be read;

(b) directly transferring serially only to a serial port of a memory array a binary representation of light impinging on the light-detector array;

(c) scanning said binary representation in the memory array via a parallel port of said memory array to produce electrical data output to processing means;

(d) evaluating said electrical output including finding the presence of bar code symbol information by said processing means to thereby determine orientation of said linearly arranged pattern of bar code data in said bar code symbol; and (e) thereafter scanning said binary representation in the memory array via said parallel port of said memory array using addressing based on said determined orientation to produce electrical bar code data to said processing means, and decoding said electrical bar code data using said processing means.

2. A method according to claim 1 wherein said step of optically imaging includes directing light onto said field of view and focusing reflected light onto said light-detector array.

3. A method according to claim 1 wherein said light-detector array is a CCD device, and said step of transferring includes serially accessing the light-detector array.

4. A method according to claim 1 wherein said step of scanning the memory array includes addressing rows and columns of an array of memory cells of the memory array in a sequence of linear patterns including at least two linear patterns angularly positioned with respect to the rows and columns.

5. A method according to claim 1 wherein the symbol includes a plurality of rows of bar code patterns in a two-dimensional array.

6. A method according to claim 1 wherein said light-detector array is in a stationary unit aimed toward said field of view.

7. A method according to claim 1 wherein said light-detector array is in a hand-held unit adapted to be aimed toward the bar code symbol, and the hand-held unit includes a manually activated trigger; and wherein said method includes responding to activation of said trigger to initiate said steps of transferring and scanning.

8. A method according to claim 1 wherein the angular orientation of the symbol within the field of view may be non-parallel to the rows or columns of the light-detector array.

9. A method according to claim 1 further comprising the step of determining the orientation of a symbol included in said representation and then scanning said memory array based upon said determination.

10. A method according to claim 1 further comprising the step of identifying patterns in said binary representation corresponding to bar code symbols.

11. A method according to claim 10 wherein said step of identifying includes the step of counting transitions from one type of binary data to the other.

12. A method of operating a bar code scanner for reading two-dimensional bar code symbols of the type having a plurality of rows of bar code data, said method comprising the steps of:

(a) generating directly in a light-responsive array a binary representation of a two-dimensional field of view, said field of view including a symbol to be read; said generating including the step of optically imaging said field of view onto said light-responsive array to generate said binary representation of said field of view; then serially transferring said binary representation to a memory array by direct serial only coupling;

(b) scanning said memory array via a parallel port to said memory array, said scanning including generating an effective scan line having an angular orientation corresponding to that of a representation of said symbol included within said binary representation, said scanning being effective to produce electrical data output; and scanning including using said processing means to read the electrical data output to locate a portion of the bar code information and determine said angular orientation of said bar code information, and thereafter addressing said memory based on said angular orientation to produce electrical data output corresponding to complete rows of said symbol.

13. A method according to claim 12 wherein said generating includes reading said memory in a regular pattern and checking for recognizable bar code characters, then reading said memory using a sequence of addresses determined from the location of said recognizable bar code characters.

14. A method according to claim 12 wherein said step of scanning said memory array includes addressing rows and columns of an array of memory cells of that memory array in a sequence of linear patterns at a plurality of different angles with respect to the rows and columns.

15. A method according to claim 12 wherein the symbol includes at least one row of bar code patterns.

16. A method according to claim 15 wherein the symbol includes a plurality of rows of bar code patterns in a two-dimensional array.

17. Apparatus according to claim 15 wherein said processing means accessing the memory array evaluates data read from said memory array to identify bar code patterns by detecting the ratio of data representing bars to data representing space between bars.

18. A method according to claim 12 wherein the light-responsive array is in a hand-held unit which includes a manually activated trigger, and the method includes activating said trigger to initiate said step of generating.

19. A method according to claim 12 wherein the angular orientation of said bar code symbol is variable, and the lines of said scanning of the memory array are at variable angles.

20. A method according to claim 12 wherein said light-responsive array is in a stationary unit aimed toward a fixed field of view.

21. A method according to claim 12 including, prior to said step of generating a scan line, performing the step of identifying patterns in said binary representation corresponding to the bar code symbol by reading out said binary representation and evaluating said read out in a CPU.

22. A method according to claim 21 wherein said step of identifying includes the step of counting transitions from one type of binary data to the other.

23. Apparatus according to claim 21 wherein said optical means directs a light beam onto said field of view and focuses reflected light onto said light-responsive array.

24. Apparatus for reading a two-dimensional bar code symbol having plurality of rows of bar code information, comprising:
(a) optical means for imaging upon a light-responsive array a field of view which includes said symbol to be read, the array having a serial output;
(b) a memory array having a serial port receiving from said serial output a serial binary representation of light impinging upon said light-responsive array, the memory array also having a parallel port;
(c) processing means accessing the memory array via said parallel port, to determine the orientation of a symbol included within said binary representation and producing electrical data output derived from said memory array by scanning based upon orientation, and said processing means including means for finding bar code information in said binary representation for one row of said symbol to determine said orientation of said symbol for accessing said memory array to scan complete rows of said symbol.

25. Apparatus according to claim 24 wherein said processing means accessing the memory array addresses rows and columns of an array of memory cells of the memory array in a sequence of linear patterns at a plurality of different angles with respect to the rows and columns.

26. Apparatus according to claim 24 wherein said light responsive array is in a hand-held unit aimed toward the bar code symbol.

27. Apparatus according to claim 26 wherein the hand-held unit includes a manually activated trigger, said trigger being actuated to initiate said accessing of the light-responsive array.

28. Apparatus according to claim 24 wherein said means accessing the memory array evaluates data from the memory array to identify bar code patterns by counting transitions between data representing bar and data representing space between bars.

29. A method of reading a two-dimensional symbol, said symbol having a plurality of different linearly arranged indicia patterns of encoded information, each pattern having a reading direction corresponding to said linearly arranged patterns, said method comprising the steps of:
(a) optically imaging upon a light-detector device a field of view including said symbol to be read;
(b) transferring to a port of a memory a binary representation of light impinging upon the light-detector device;
(c) scanning said binary representation in said memory using a plurality of scan paths, via a port of said memory, to produce electrical output to processing means;
(d) evaluating said electrical data output including finding the presence of a part of said encoded information by said processing means and further including determining the orientation of one of said plurality of said linearly arranged patterns in said symbol; and
(e) thereafter scanning said binary representation in the memory using scan paths based on said determined orientation to produce encoded information to said processing means.

30. A method according to claim 29 wherein said light-detector device is a two-dimensional array.

31. A method according to claim 29 wherein said symbol is a plurality of parallel rows of differing bar code data and said linearly arranged patterns are said rows.

32. A method according to claim 29 wherein said memory has a serial port for receiving said binary representation from said light-detector device, and has a second port for access by said processing means.

33. A method of operating a scanner for reading a two-dimensional symbol, said symbol having differing pattern s in vertical versus horizontal directions and having preferred directional paths for reading data therein, said method comprising the steps of:
(a) generating with a light-responsive device a representation of a two-dimensional field of view, the field of view including said symbol to be read; said generating including the step of optically imaging said field of view onto said light-responsive device to generate said representation of said field of view; then transferring said representation in binary form to a memory array;
(b) scanning said memory by accessing said memory array by processing means, said scanning including generating a scan line by addressing said memory and evaluating data accessed by said addressing to find indications of valid data for a complete row of said symbol to thereby develop a scan line for a first readable path, and thereafter generating additional scan lines oriented to said scan line for a first readable row, to read additional paths of said symbol.

34. A method of reading a two-dimensional symbol, said symbol having a plurality of different linearly arranged indicia patterns of encoded information, each pattern having a preferred reading direction corresponding to said linearly arranged patterns, said method comprising the steps of:

(a) optically imaging upon a light-detector device a field of view including said symbol to be read;

(b) transferring to a port of a memory a binary representation of light impinging upon the light-detector array;

(c) scanning said binary representation in the memory using a plurality of scan paths, via a port of said memory to produce electrical data output to processing means;

(d) evaluating said electrical data output including finding said symbol by detecting characteristics of a portion of said symbol, then orienting said scan paths until a full pattern is found in a given scan path, then continuing to scan said memory using further scan paths oriented according to said given scan path.

35. A method according to claim 34 wherein further scan paths are linear and parallel.

36. A method according to claim 34 wherein said light-detector device is a two-dimensional array.

37. A method according to claim 34 wherein said symbol is a plurality of parallel rows of differing bar code data and said linearly arranged patterns are said arrays.

38. A method according to claim 34 wherein said memory has a serial port for receiving said binary representation from said light-detector device, and has a second port for access by said processing means.

39. A method of reading a bar code symbol or the like comprising the steps of:

(a) optically imaging upon a light-detector array a field of view including a symbol to be read;

(b) transferring to a memory array a binary representation of light impinging upon the light-detector array;

(c) scanning said memory array along a sequence of scan paths to produce electrical data output to at least a corresponding segment of a row including bar code information;

(d) changing said sequence of scan paths if a partial row of bar code information is detected within a single scan line of said scan paths; and (e) repeating steps (c) and (d) until the data represented in the complete symbol has been recognized.

* * * * *

UNITED STATES PATENT AND TRADEMARK OFFICE
CERTIFICATE OF CORRECTION

PATENT NO. : 5,591,952
APPLICATION NO. : 08/378596
DATED : January 7, 1997
INVENTOR(S) : Krichever et al.

It is certified that error appears in the above-identified patent and that said Letters Patent is hereby corrected as shown below:

Column 15, line 4      Delete: "array" and

Insert --device-- in its place

Column 15, line 21      Delete: "arrays" and
Insert --rows-- in its place

Signed and Sealed this

Eighth Day of August, 2006

JON W. DUDAS
*Director of the United States Patent and Trademark Office*